US006832377B1

(12) United States Patent
Havemose

(10) Patent No.: US 6,832,377 B1
(45) Date of Patent: Dec. 14, 2004

(54) UNIVERSAL REGISTRATION SYSTEM

(75) Inventor: Allan Havemose, San Jose, CA (US)

(73) Assignee: Gateway, Inc., Poway, CA (US)

(*) Notice: Subject to any disclaimer, the term of this patent is extended or adjusted under 35 U.S.C. 154(b) by 0 days.

(21) Appl. No.: 09/542,559

(22) Filed: Apr. 4, 2000

Related U.S. Application Data

(63) Continuation-in-part of application No. 09/312,123, filed on May 14, 1999, now Pat. No. 6,757,903.
(60) Provisional application No. 60/127,767, filed on Apr. 5, 1999.

(51) Int. Cl.$^7$ ................................................. G06F 9/00
(52) U.S. Cl. ..................... 718/104; 709/229; 709/223; 719/315; 713/202; 705/50
(58) Field of Search .................. 718/104; 709/217–219, 709/223–226, 229, 104; 719/310, 312, 315, 316; 713/155, 202; 707/103; 705/50–78

(56) References Cited

U.S. PATENT DOCUMENTS

| | | | | |
|---|---|---|---|---|
| 5,241,594 A | * | 8/1993 | Kung | 713/151 |
| 5,341,478 A | * | 8/1994 | Travis et al. | 709/203 |
| 5,684,950 A | * | 11/1997 | Dare et al. | 713/201 |
| 5,778,187 A | * | 7/1998 | Monteiro et al. | 709/231 |
| 5,857,102 A | * | 1/1999 | McChesney et al. | 713/100 |
| 5,872,914 A | * | 2/1999 | Walker et al. | 713/202 |
| 5,991,878 A | * | 11/1999 | McDonough et al. | 713/200 |
| 6,058,426 A | * | 5/2000 | Godwin et al. | 709/229 |
| 6,070,168 A | * | 5/2000 | Jacuzio | 707/103 R |
| 6,092,196 A | * | 7/2000 | Reiche | 713/200 |
| 6,185,609 B1 | * | 2/2001 | Rangarajan et al. | 709/219 |
| 6,243,763 B1 | * | 6/2001 | Brodsky et al. | 719/316 |
| 6,311,219 B1 | * | 10/2001 | Factor | 709/229 |
| 6,418,482 B1 | * | 7/2002 | Brodsky et al. | 719/313 |
| 6,453,350 B1 | * | 9/2002 | Factor | 709/226 |
| 6,523,022 B1 | * | 2/2003 | Hobbs | 707/3 |

(List continued on next page.)

FOREIGN PATENT DOCUMENTS

| | | | | | |
|---|---|---|---|---|---|
| JP | 2000106552 A | * | 4/2000 | | H04L/9/32 |
| JP | 2001092555 A | * | 4/2001 | | G06F/1/00 |
| KR | 2002017515 A | * | 3/2002 | | H04L/9/32 |

OTHER PUBLICATIONS

Foster, Ian et a. "A Security Architecutre for Computational Grids." ACM. 1998.*
Doherty, Sean. "Adopting Single Sign–On for NDS." Network Computing. Nov. 1, 1999.*
Hoare, C.A.R. et al. "Bertrand Meyer Object–oriented Software Construction." Prentice–Hall International Ltd. 1988, pp. 79–84.*

Primary Examiner—Lewis A. Bullock, Jr.
(74) Attorney, Agent, or Firm—Scott Charles Richardson; Peng Zhu; Suiter-West

(57) ABSTRACT

The present invention provides a business process feature for providing universal registration in an information appliance network. The business process feature includes providing user registration information to a universal registration resource, the user registration information accessible by providers of resources via the information appliance network. The business process feature further includes requesting use of a provider resource requiring the user registration information wherein the provider resource automatically retrieves the user registration information from the universal registration resource to enable the user to access the resources. Additionally, the present invention provides a method for providing universal registration, including accessing a resource, passing a registration interface dynamic base object to the resource, and interrogating the registration interface dynamic base object for registration information. The registration interface dynamic base object transfers the interrogation for registration information to a registration implementation dynamic base object, the registration implementation dynamic base object capable of providing registration information.

23 Claims, 10 Drawing Sheets

U.S. PATENT DOCUMENTS

| | | | |
|---|---|---|---|
| 6,584,489 B1 * | 6/2003 | Jones et al. | 718/104 |
| 2001/0009026 A1 * | 7/2001 | Terao et al. | 713/170 |
| 2002/0144118 A1 * | 10/2002 | Maruyama | 713/170 |
| 2002/0184217 A1 * | 12/2002 | Bisbee et al. | 707/9 |
| 2003/0014656 A1 * | 1/2003 | Ault et al. | 713/200 |

* cited by examiner

UNIVERSAL REGISTRATION SYSTEM

CROSS REFERENCE TO RELATED APPLICATIONS

The present application claims the benefit under 35 U.S.C. § 119(e) of U.S. Provisional Patent Application Ser. No. 60/127,767 filed on Apr. 5, 1999. Said U.S. Provisional Application 60/127,767 is herein incorporated by reference in its entirety. The present application is a continuation in-part and also claims the benefit under 35 U.S.C. § 120 of U.S. patent application Ser. No. 09/312,123, now U.S. Pat. No. 6,757,903, filing date of May 14, 1999. The present application also incorporates the following applications by reference in their entirety:

Filing Date Apr. 4, 2000 Ser. No. 09/542,716 STILL PENDING

Filing Date Apr. 4, 2000 Ser. No. 09/542,743 STILL PENDING

Filing Date Apr. 4, 2000 Ser. No. 09/542,159 STILL PENDING

Filing Date Apr. 4, 2000 Ser. No. 09/542,714 STILL PENDING.

FIELD OF THE INVENTION

The present invention relates generally to the fields of registration, and more specifically to methods and apparatus for implementing business process features including universal registration over a network of digital information appliances, networked computers/devices, and conventional computers.

BACKGROUND OF THE INVENTION

Methods and apparatus for transacting business over a network are old in the art. For example, telephone communications have long been utilized to transact purchases and transfer funds between accounts. Likewise, current cable and satellite television systems allow viewers to order video and audio content paid for via a viewer's credit or debit account information. Additionally, "on-line" purchases of goods and services are becoming common over the Internet. However, such methods and apparatus do not allow a buyer and a seller to transact business utilizing a common or universal transaction system.

Digital information appliances (DIA) include electronic devices designed to perform a specific function or group of functions more efficiently than would a conventional computer system. Like computer systems, information appliances may be interconnected with a network such as the Internet to provide content and functions which would not be available when the appliances operated independently. Preferably, such network connections are transparent to the user so that the complexity of the underlying computer network is masked. In this manner, information appliances provide advantages in simplicity of operation and computing ease of use to their users.

As the proliferation of digital information appliances accelerates, it will become necessary to develop a standard system architecture and operating environment to facilitate their use and interconnection with each other and other networked devices. Such a system architecture may utilize a distributed object model employing object oriented programming methods. Object oriented programming is a programming paradigm (method) wherein a program is organized as a collection of discrete objects that are self-contained collections of data structures and routines that interact with that data. Such objects encapsulate related data and procedures so as to hide that information by allowing access to the data and procedures only through the object's published interface. Hence changes to the data and or procedures of the object are isolated from other objects. This provides an architecture that is more easily maintained since changes to an object's code does not affect other objects.

Likewise, object oriented programming methods provide for inheritance of an object's characteristics into another class of object. Thus, an object may be derived from a first object to form a second object which "inherits" certain properties of its parent object. This allows for both (1) the formation of subclasses of objects having more specialized features and/or capabilities, and (2) the reuse of individual objects in different programs. Thus, libraries of proven objects may be developed which may be used repeatedly in different applications.

In developing a standard appliance system architecture, it is desirable to allow access to objects in a transparent fashion so that objects created in different programming languages and objects residing on different appliances, network servers, or computer systems that are networked together are accessible to the user without extensive modification of the user's programming code. For computer networks, this capability may be provided by object oriented distributed environments such as the common object request broker architecture (CORBA). Such system architectures are based upon a client-server model, in which object servers provide public interfaces to object-clients that make requests of the object servers. Typically in such systems, the servers are objects consisting of data and associated methods. The object clients obtain access to the object servers by sending them messages which are mediated by the distributed system. When the server object receives the message it invokes the appropriate method and transmits the result back to the object client. The object-client and object server communicate through an Object Request Broker (ORB) which is used to locate the various distributed objects and establish communication between the objects and the client. However, such existing distributed object architectures require that all transactions (communications between client objects and server objects) must pass through an ORB. As a result, the ORB becomes a single failure point which could potentially disable such a system. Further, an ORB typically requires a large amount of memory. Thus, architectures such as CORBA would be unsuitable for "thin" (simple) appliances which have a limited amount of memory.

Consequently, it would be advantageous to develop an information appliance management system employing a standard appliance system architecture. Such an information appliance management system would provide greater fault tolerance than conventional object based architectures, and may be implemented on thin appliances having a limited amount of memory. The information appliance management system would allow management of transactions performed through information appliances.

Additionally, current methods of registering users for access to resources over the Internet may be cumbersome and inefficient. In most instances, a user desiring access to a particular resource must enter personal information, such as name, credit card information for fee-required resources, or other billing information. Therefore, it would be advantageous to provide universal registration of a digital information appliance.

SUMMARY OF THE INVENTION

The present invention provides a universal information appliance management system capable of executing transactions, including financial transactions, across a distributed network.

The present invention provides a business process feature for providing universal registration in an information appliance network. The business process feature includes providing user registration information to a universal registration resource, the user registration information accessible by providers of resources via the information appliance network. The business process feature further includes requesting use of a provider resource requiring the user registration information wherein the provider resource automatically retrieves the user registration information from the universal registration resource to enable the user to access the resources.

Additionally, the present invention provides a method for providing universal registration, including accessing a resource, passing a registration interface dynamic base object to the resource, and interrogating the registration interface dynamic base object for registration information. The registration interface dynamic base object transfers the interrogation for registration information to a registration implementation dynamic base object, the registration implementation dynamic base object capable of providing registration information.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
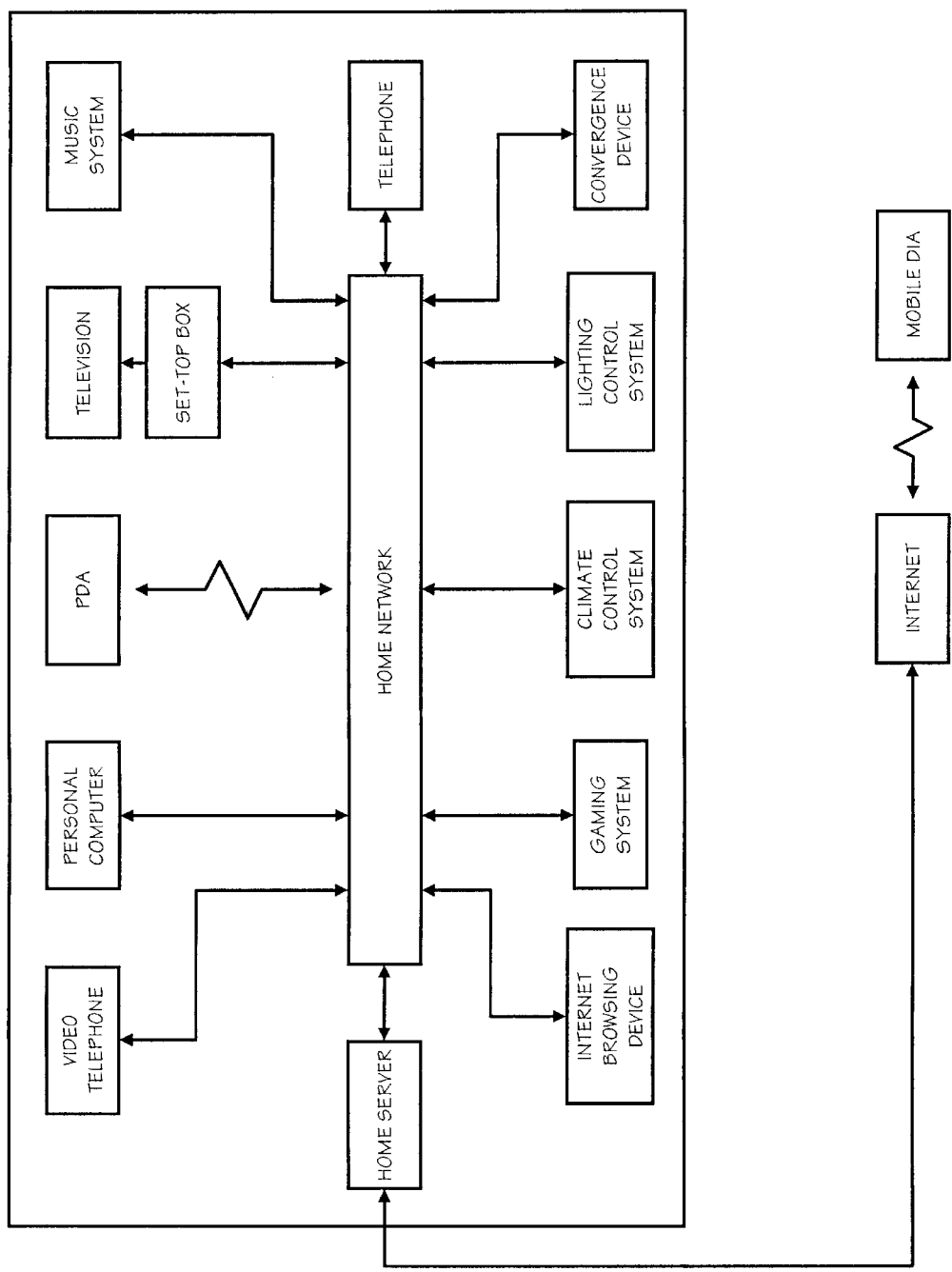
FIG. 1 is a block diagram illustrating a network of information appliances having a local and a global portion operated at least partially by the architecture of the present invention.

Referring generally now to FIGS. 1 though 9, exemplary systems and methods for providing universal registration are shown. Current methods of registering users for access to resources over the Internet may be cumbersome and inefficient. In most instances, a user desiring access to a particular resource must enter personal information, such as name, credit card information for fee-required resources, or other billing information. The present invention solves this problem by allowing the user of a digital information appliance to universally register. Universal registration allows a central checkpoint to be utilized to permit access to a variety of registration required resources without the need to re-register at each resource. Furthermore, by utilizing a registration dynamic base object (DBO), registration for particular sites may be achieved automatically by allowing the registration-DBO to provide the information required by the resource. Additionally, universal registration may be utilized to uniquely name DBOs so as to permit a DBO or set of DBOs to have a unique name to permit a user to create, maintain, and utilize personal DBOs.

Referring generally now to FIGS. 1 through 5, a system architecture and operating environment for digital information appliances (DIAs) which allows for features and feature enhancements for digital information appliances and the like is shown. A DIA is any electronic device capable of operating on a computer network in batch or real-time. Most DIA's include an I/O, a ROM, and a memory. DIAs include both single feature and multiple feature devices, such as information handling systems. In a preferred embodiment, DIAs operate in the network of the present environment with general purpose computers and the like (FIG. 1).

System Architecture and Operating Environment

To best understand the many novel and innovative features of the universal information appliance management system of the present invention, a discussion of an exemplary underlying system architecture and operating environment is in order. While the patentable features of the present system architecture and operating environment (as claimed herein) will be apparent, other object based or procedural architectures may be utilized to implement the information appliance management system of the present invention.

An object based implementation is described in the preferred embodiment, however those skilled in the art will recognize that the architecture, including a functional hierarchy and an administration function, could be implemented in a procedural implementation without departing from the spirit of the invention.

Figure 2:
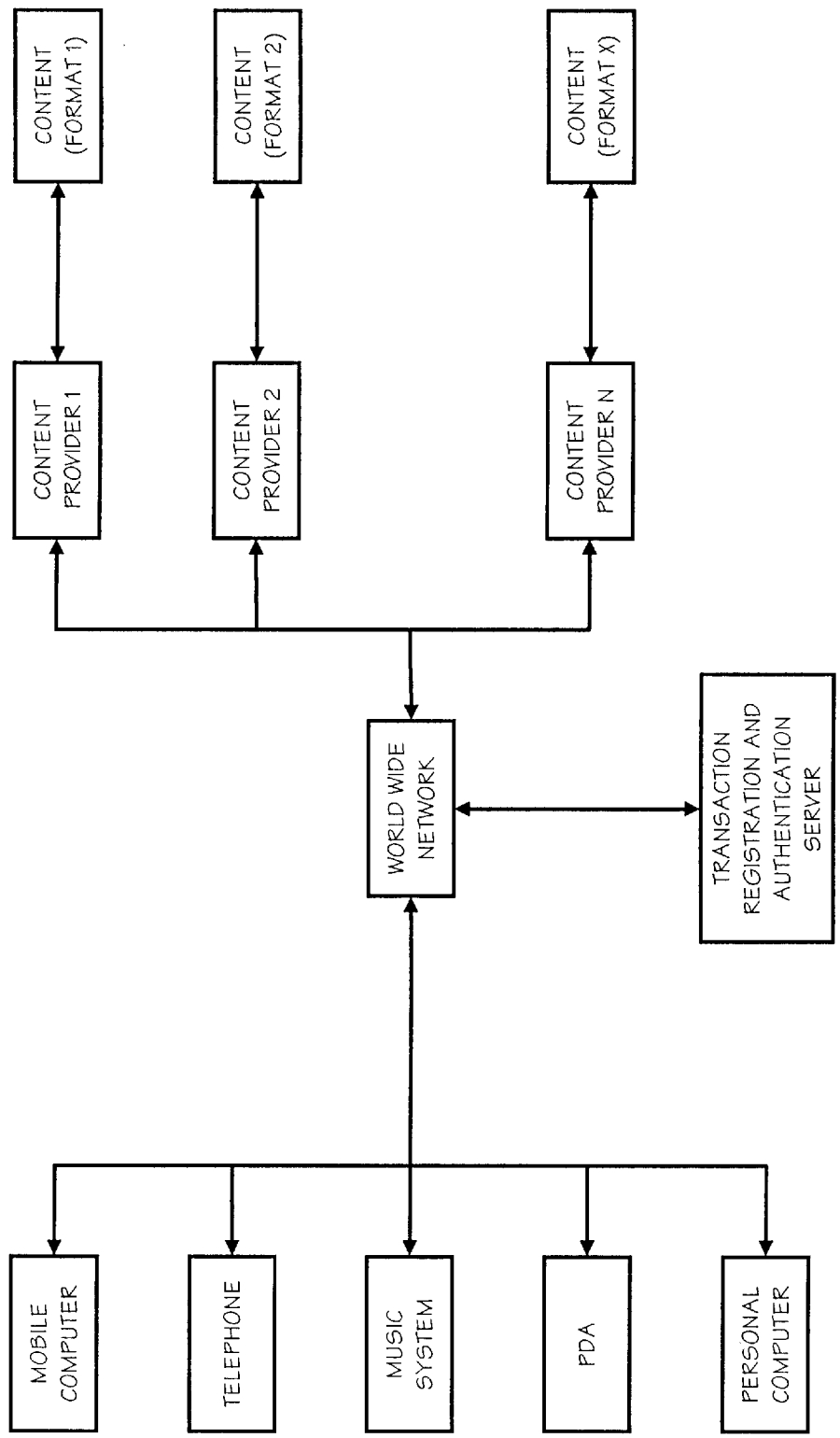
FIG. 2 is a block diagram illustrating content exchange between computers and information appliances over a network at least partially operated by the architecture of the present invention.

The system architecture and operating environment of the present invention (herein after "the architecture") includes an object hierarchy and object administrator. Together the object hierarchy and object administrator provide additional services not offered by the underlying operating system. The architecture of the present invention creates a scalable, object driven software architecture that supports both simple appliances, network computers/devices and general purpose computers such as personal computers, servers, "mainframe" computers, and "super" computers (FIG. 2).

The architecture of the present invention supports the creation of compelling and easy-to-use consumer and desktop user-interfaces. Additionally, networking within the architecture of the present invention is pervasive, i.e., resources on the network behave as local resources and execution is transportable across network boundaries.

Dynamic Base-Objects

The architecture of the present invention also enables efficient development of applications; whether work processors (e.g., word processors), video applications, games or soft appliances. The architecture of the present invention includes dynamic base-objects (DBO). Each DBO implements a defined behavior, but may in addition request and use capabilities of another DBO. DBOs may also provide services to another object such as a DBO requesting another DBO.

Figure 3:
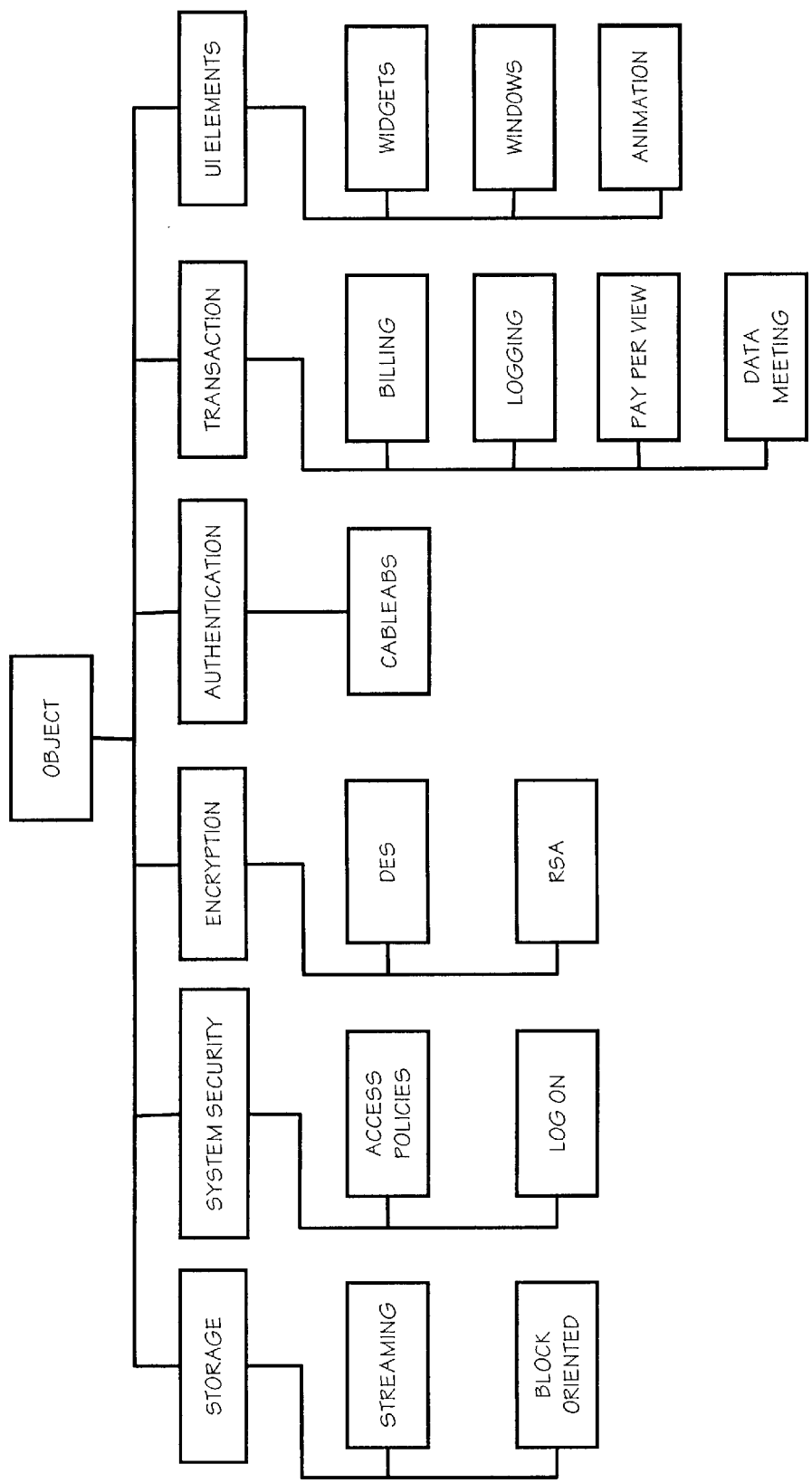
FIG. 3 is a block diagram illustrating the hierarchy of the dynamic objects which operate within the architecture of the scalable, distributed network of the present invention.

In a presently preferred embodiment of the invention a DBO may provide service routines to manage identification and communication with other DBOs. The architecture of the present invention also provides a DBO hierarchy, wherein each DBO or class within the hierarchy specializes in providing one particular type of service. A presently preferred exemplary embodiment of this hierarchy is illustrated in FIG. 3. The hierarchy of the present invention allows for features and capabilities not found in prior art object oriented programming.

Figure 4:
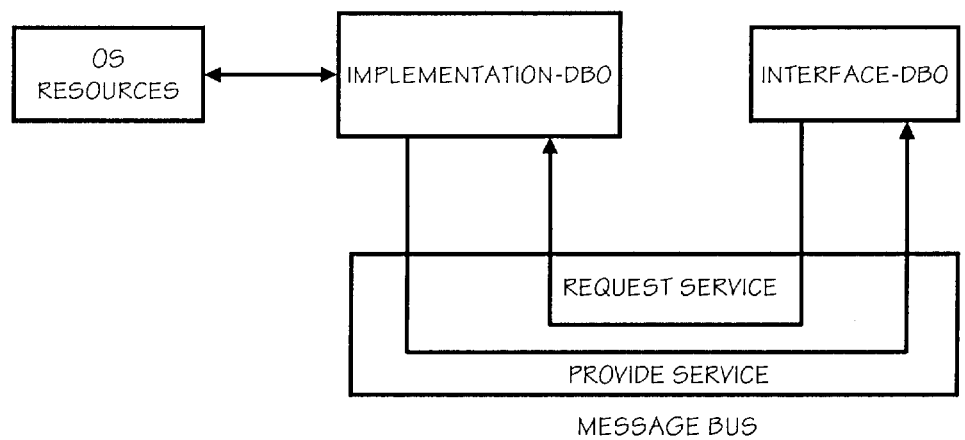
FIG. 4 is a block diagram illustrating the relationship between both implementation-dynamic-base-objects (hereinafter "implementation-DBO") and interface-dynamic-base-objects (hereinafter "interface-DBO") operating within the language neutral architecture of the scalable, distributed network of the present invention.
Figure 5:
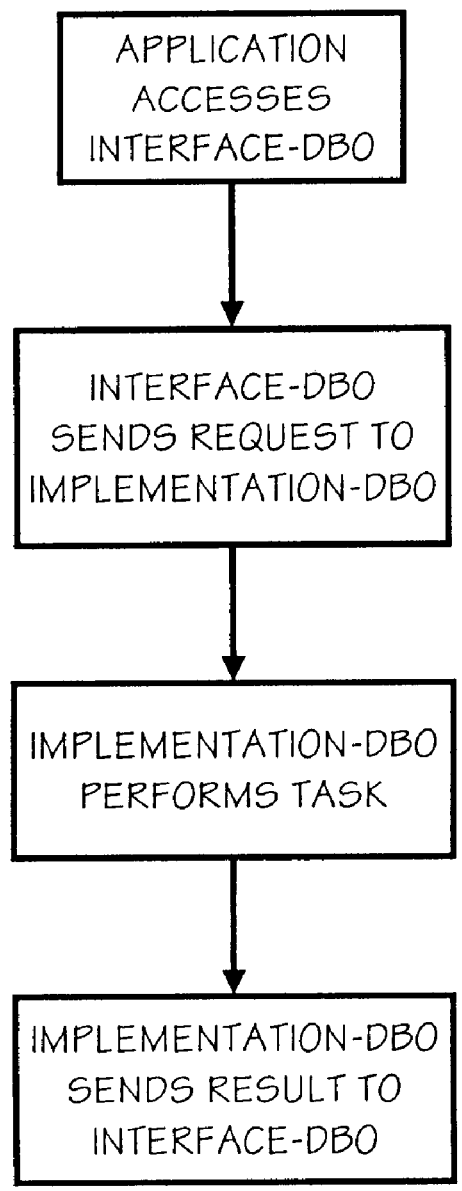
FIG. 5 is a flow diagram illustrating the operation of interface-DBOs and implementation-DBOs for providing architecture features and capabilities within the architecture of the scalable, distributed network of the present invention.

In an exemplary embodiment of the architecture of the present invention when an application, for example, creates a DBO, two DBOs are actually created. These two DBOs are an interface-DBO within the application, and an instance of the real DBO (a/k/a an implementation-DBO). This relationship is best illustrated in FIG. 4. In a preferred embodiment of the invention, each time the application uses the interface-DBO, a message is sent to the implementation-DBO, which carries out the task and returns the result, as shown in FIG. 5. When the application frees the DBO the reverse happens. The implementation-DBO gets a message call to de-allocate its resources and terminate.

In an exemplary embodiment of the present invention the hierarchy of the present invention allows the polymorphic and inheritance features of object oriented programming to be more fully realized. For example, in the present invention polymorphism (which allows a routine in a derived class to be redefined), and inheritance (which allows for the derivation of desired characteristics within a subclass) operate to produce object construction, implementation, and utilization without centralized control, i.e., the object hierarchy of the objects of the present invention manage object construction, implementation, and utilization.

A DBO may be either memory or disk resident. A DBO required for execution is loaded from disk if not present in memory. In a preferred embodiment, DBOs have the following "behavioral" characteristics: (1) capability or feature may be dynamically created, added and changed; (2) other objects including other DBOs may provide a DBO with additional capabilities or features; (3) self checking mechanism with dynamic re-start and re-initialization upon runtime or like failure (4) standardized communication and services interface (e.g., object-to-object, user-to-object, and object-to-user); and (5) full thread-safe.

Universal registration may be utilized to uniquely name DBOs so as to permit a DBO or set of DBOs to have a unique name to permit a user to create, maintain, and utilize personal DBOs. A string naming convention may incorporate the "company or organization name" of the creator, the name of the object and the name of the method or property. The formula in this example is "<company>.<objectname>.<method/property>." Under the string naming convention, each user may have a different term under the "company" portion of the string naming formula. By utilizing universal registration, the unique user name may be verified and stored so that each user may be guaranteed a unique ID, thereby permitting the benefit of user unique DBOs. In a presently preferred embodiment of the present invention a nomenclature or naming convention is utilized so as to facilitate operation and maintain class hierarchy.

For example, in a client/server architecture objects must be uniquely identified across the network. In an exemplary embodiment Properties and Methods are uniquely identified by using a string naming convention, that incorporates: (1) the "company or organization name" of the creator, (2) the name of the object, and (3) the name of the method or property. The nomenclature convention is:

"<company>.<objectname>.<method/property>"

For the property "width" in the "window" object created by allen, the name would be:

allen.window.width

For the "Add" method in a math function:

allen.math.add

This naming convention ensures that names are unique across all systems. It should be noted in a "Distributed Computing Environment" (DCE) an algorithm exists which produces a unique 128-bit value from the ID on an Ethernet card. This ID includes, for example, the local time of day. Since Ethernet cards are not present in all systems, the use of this prior art identification is not preferred in a network containing "thin" information appliances. Furthermore, the use of the string implementation of the present invention is easier to understand.

Figure 6:
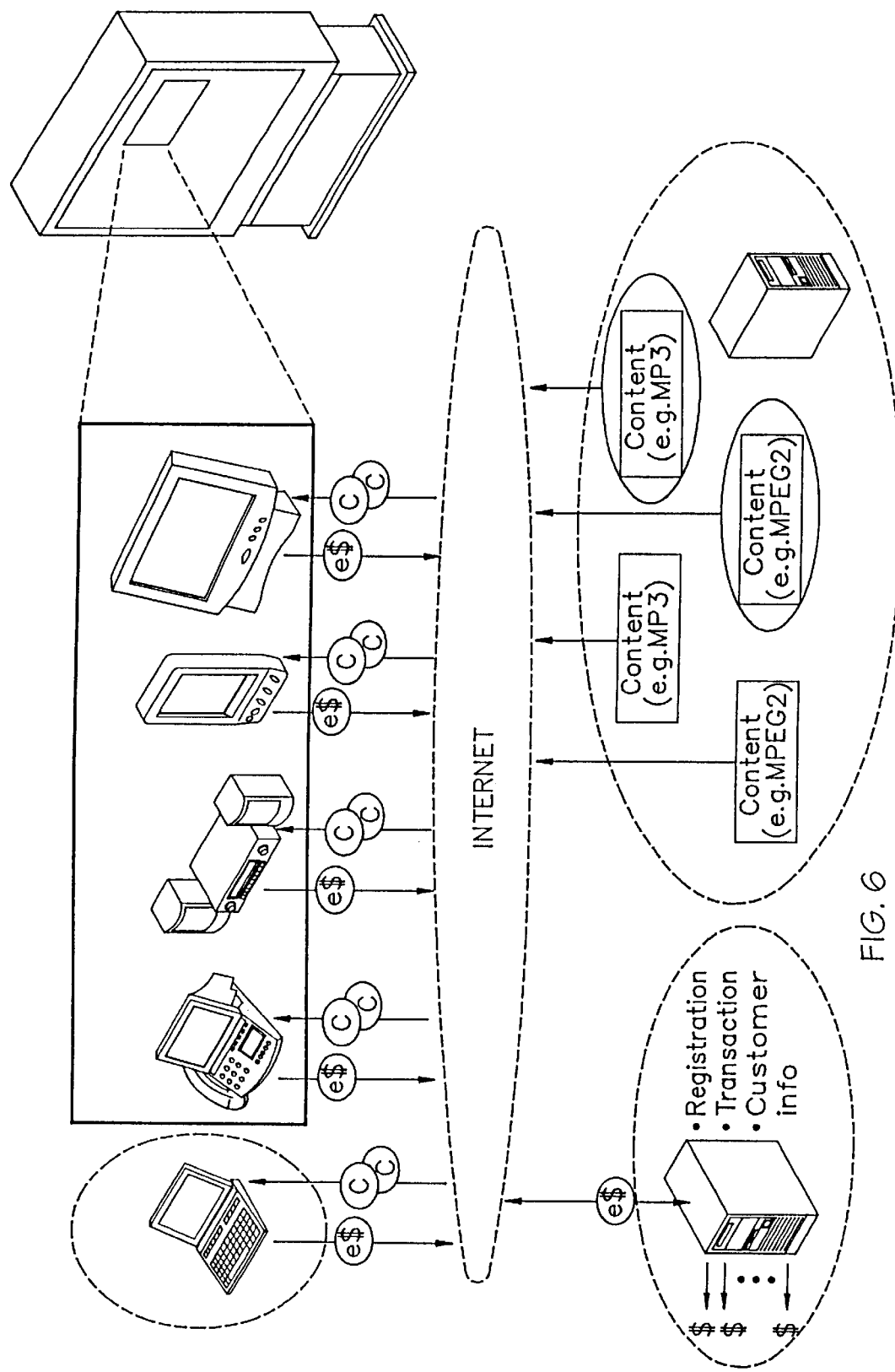
FIG. 6 is a block diagram illustrating an exemplary universal registration within the architecture of the scalable, distributed network of the present invention.

Referring now to FIG. 6, an example of the utilization of universal registration within the architecture of the scalable, distributed network of the present invention is shown. A user, either during the first time utilizing a digital information appliance or later when desiring to utilize charged content resources may enter registration information into a universal registration resource. This resource may query the user for relevant payment and other necessary information, such as an address for sending purchased goods, billing information, and the like. While registering under this system, it may be preferable to query the user to pre-register with the most popular resources that the user may happen to frequent. This may be as simple as checking a box showing the resource names. Once registered, the user may gain easy and uninterrupted access to those preregistered resources without having to re-enter the registration information.

Figure 7A:
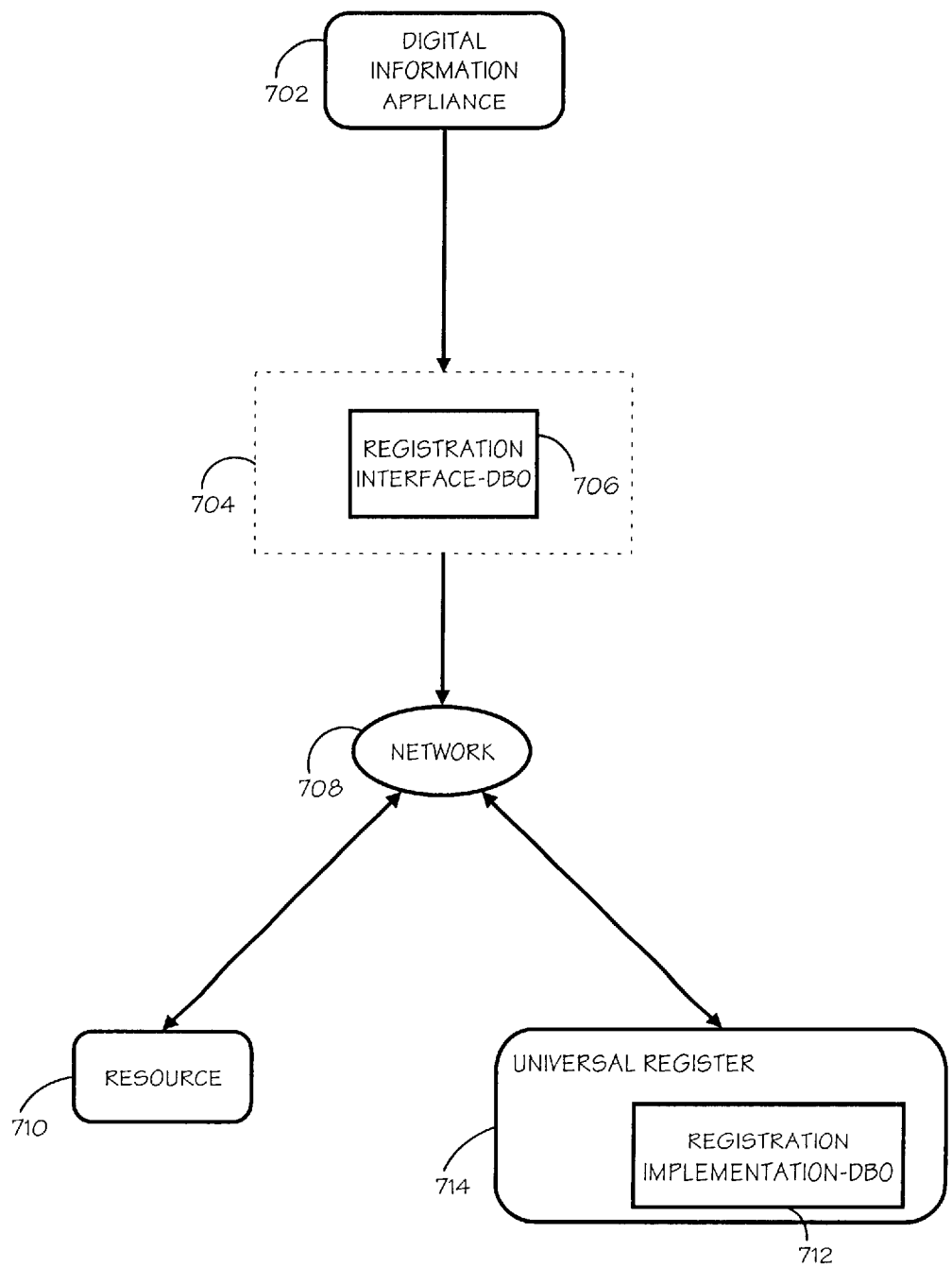
FIG. 7A is a block diagram illustrating embedded universal registration within the architecture of the scalable, distributed network of the present invention.

Furthermore, registration information may be contained in a registration DBO so that it may be easily downloaded and accessed by a variety of systems so as not to require the user to enter registration information on resources where the user is not pre-registered. For example, a registration-DBO may be able to identify the particular fields that need to be filled and supply that information from registration information contained in the registration-DBO. By having a registration DBO handle the particulars of the registration, the user may seamlessly utilize a variety of registration resources without having to individually register at each particular resource. For example, as shown in FIG. 7A, a user utilizing a digital information appliance 702 may send an access query 704 with an embedded registration interface-DBO 706 to access a resource 710 over a network 708. Thus, if the resource 710 requires registration, the registration interface-DBO 706 may supply the needed information from a registration implementation-DBO 712 located at a universal register 714. In this way, a user may gain access to registration required resources without the need of entering and reentering registration information every time the user wished to access the resource. Further, the registration information may be located at a location different than the registration interface-DBO, thereby enabling resource savings on the digital information appliance.

Figure 7B:
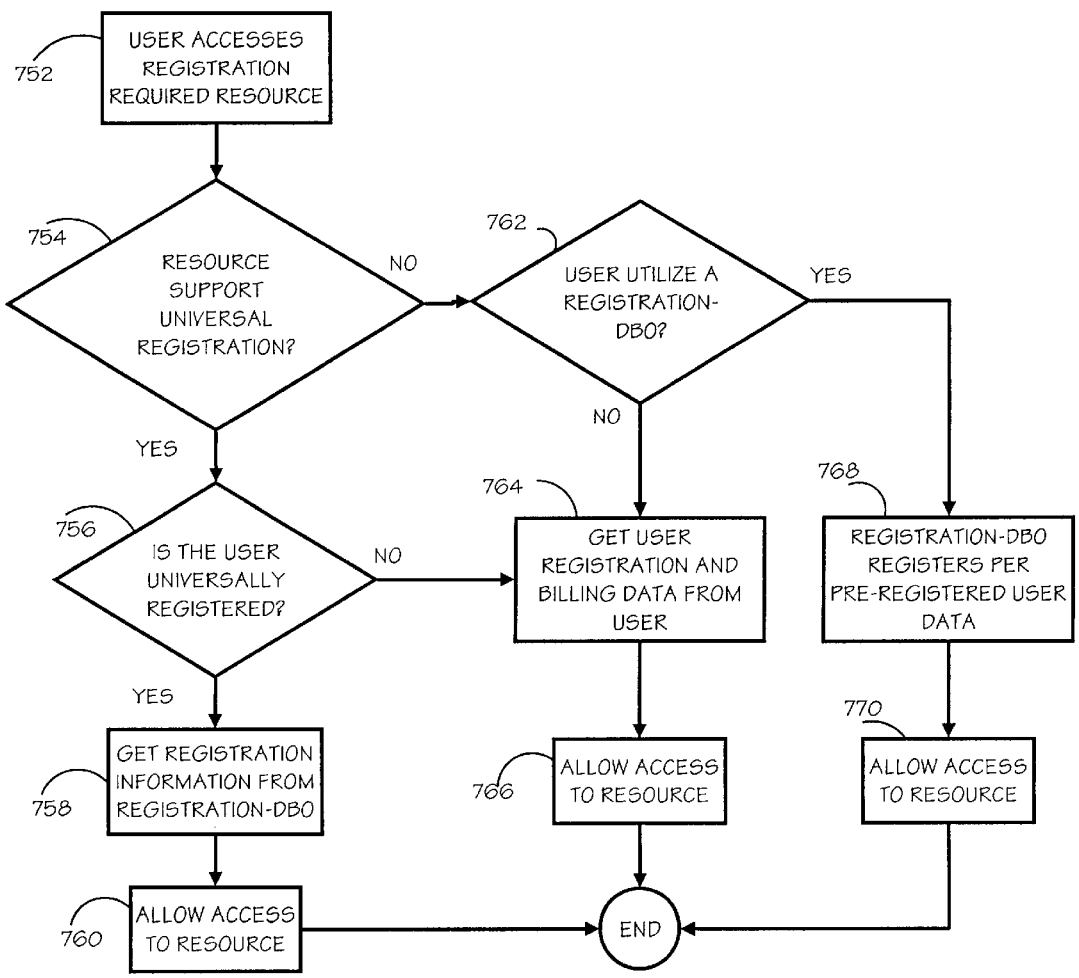
FIG. 7B is a flow diagram illustrating universal registration within the architecture of the scalable, distributed network of the present invention.

An additional exemplary embodiment of an application of universal registration and the advantages of a registration DBO is shown in FIG. 7B. In this example, a user attempts to access a resource that requires registration 752. If the resource supports universal registration 754, and the user is universally registered 756, the resource may acquire registration information for the registration-DBO contained in a universal register. In this way, the user may gain seamless access to the resource without the need of entering registration and other information. This information may be contained in a registration DBO that the resource may access once the user attempts to utilize the resource. However, if the resource does not support universal registration 754, the user may still utilize a registration-DBO 762 to automatically insert registration information from that information contained in the pre-registered user data 770. In this instance, the registration-DBO enters the information for the user, thereby increasing the efficiency of utilizing the resource. If the user is not universally registered 756 and does not utilize a registration-DBO 762, the user must enter the required registration information and billing information manually to gain access to the resource 766. This information may include name, address, credit card, expiration date of the credit card, phone number, email address, and the like. By enabling the user to universally register, the user may access a variety of resources without the time consuming process of re-entering the registration information.

Figure 8:
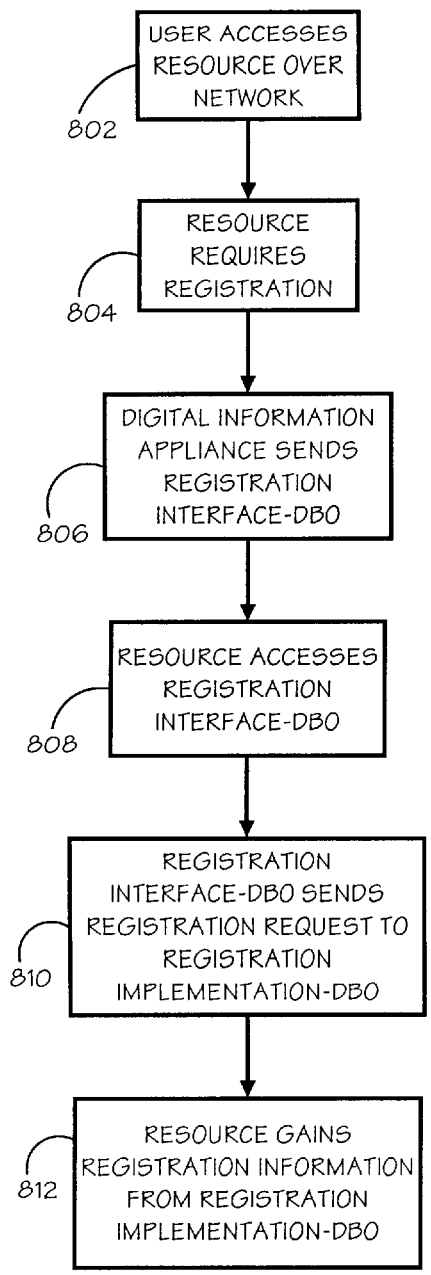
FIG. 8 is a flow diagram illustrating an additional embodiment of universal registration wherein universal registration may be accomplished through accessing a dynamic base object.
Figure 9:
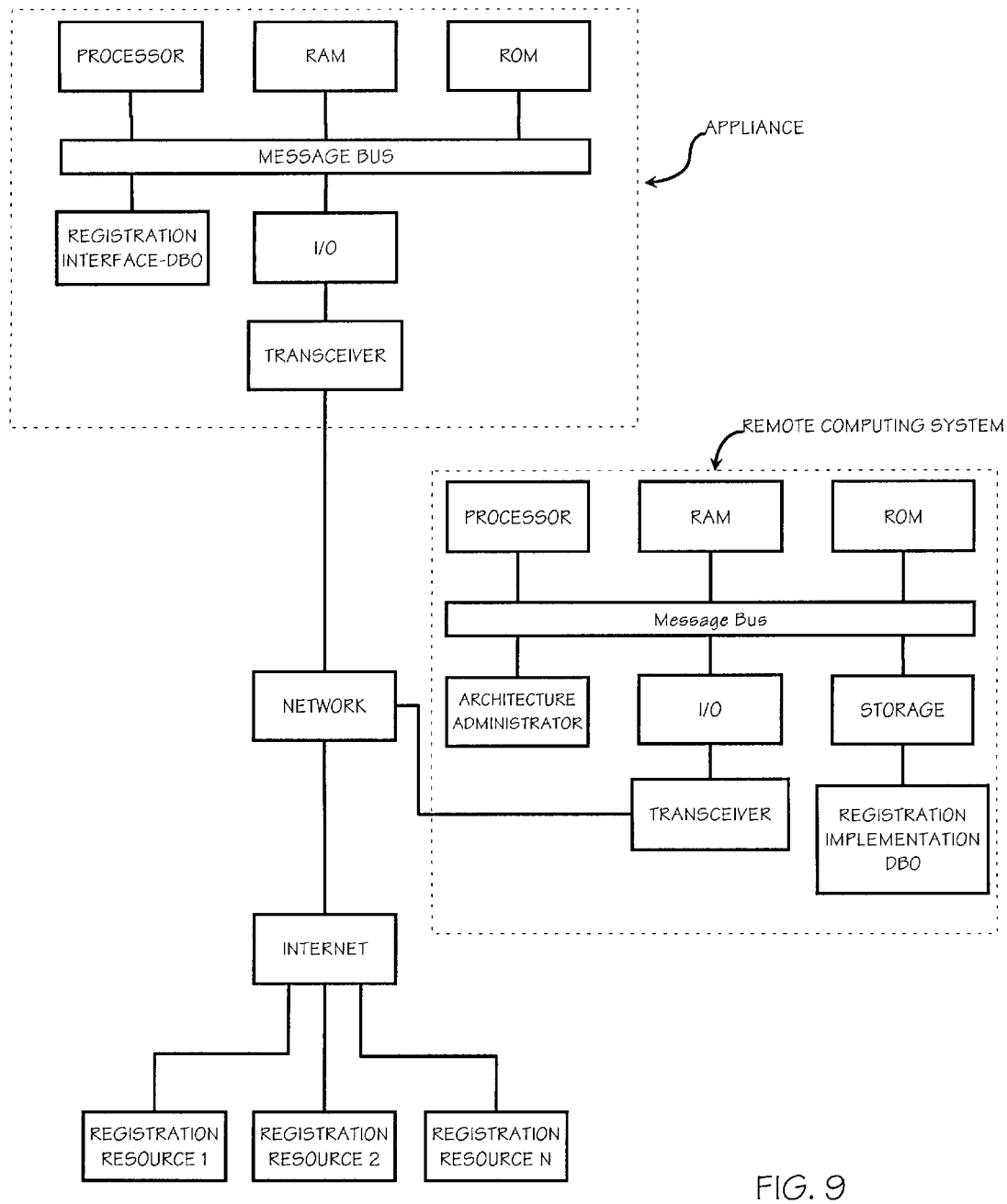
FIG. 9 is a block diagram illustrating scalable resource sharing between, for example, a "thin" information appliance within the architecture of the scalable, distributed network of the present invention.

One of the advantages of utilizing universal registration with a DBO is that the interface-DBO may be utilized to insert information from an implementation-DBO existing elsewhere on a network. For example, as shown in FIG. 8, a user accessing a resource on a network 802 may have to register with the resource to gain access 804. Therefore, an instance of an interface-DBO may be automatically passed to the resource from the appliance 806. The resource may then access the interface-DBO 808 to gain information on where to find the implementation-DBO carrying the actual registration information 810. Then, the resource may obtain the necessary registration information 812. In this way, resources may be conserved on a thin digital information appliance such that the digital information appliance need only store the interface-DBO while the registration implementation DBO stores the actual registration information elsewhere. (FIG. 9) Further, since implementation-DBOs may be stored at a single location, the veracity of the registration information may be protected.

Thus, there has been described an object driven software architecture and several process features which together provide for at least all of the advantages stated herein. Although the invention has been described with a certain degree of particularity, it should be recognized that elements thereof may be altered by persons skilled in the art without departing from the spirit and scope of the invention. It is believed that the universal registration system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A business process for providing universal registration in an information appliance network, comprising:
   providing user registration information to a universal registration resource, said user registration information accessible by providers of resources via the information appliance network; and
   requesting use of a provider resource requiring the user registration information wherein said provider resource automatically retrieves the user registration information from the universal registration resource to enable the user to access the resources;
   wherein said user registration information is contained in a program object; and
      wherein said program object includes an interface dynamic base object and an implementation dynamic base object.

2. The business process of claim 1, wherein the registration interface dynamic base object is capable of transferring the interrogation for registration information to the registration implementation dynamic base object without centralized control.

3. The business process of claim 1, wherein the registration interface dynamic base object is embedded so that as a connection is initiated between a digital information appliance and the provider resource, registration information is capable of being provided without additional user input.

4. The business process of claim 1, wherein the provider resource is not preregistered, the registration implementation dynamic base object is capable of providing registration information to the provider resource.

5. The business process of claim 1, wherein the provider resource is located on a first computer system, the registration interface dynamic base object is located on a second computer system, and the registration implementation dynamic base object is located on a third computer system.

6. A method for providing universal registration, comprising:
   accessing a resource;
   passing a registration interface dynamic base object to the resource; and
   interrogating the registration interface dynamic base object for registration information;
   wherein the registration interface dynamic base object transfers the interrogation for registration information to a registration implementation dynamic base object, the registration implementation dynamic base object capable of providing registration information.

7. The method as described in claim 6, wherein the resource is located on a first computer system, the registration interface dynamic base object is located on a second computer system, and the registration implementation dynamic base object is located on a third computer system.

8. The method as described in claim 6, wherein the registration interface dynamic base object is capable of transferring the interrogation for registration information to the registration implementation dynamic base object without centralized control.

9. The method as described in claim 6, wherein the registration interface dynamic base object is embedded in a request for accessing the resource.

10. The method as described in claim 9, wherein the registration interface dynamic base object is embedded so that as a connection is initiated between a digital information appliance and the resource, registration information is capable of being provided without additional user input.

11. The method as described in claim 6, wherein the registration implementation dynamic base object is included in a universal register.

12. The method as described in claim 6, wherein the resource is not preregistered, the registration implementation dynamic base object is capable of providing registration information to the resource.

13. The method as described in claim 6, wherein at least one of the interface dynamic base object and implementation dynamic base object includes data formatted in a string naming convention.

14. The method as described in claim 13, wherein the convention includes data formatted as <generalname>.<objectname>.<method/property>.

15. A digital information appliance, comprising:
    a processor for executing a program of instructions on the digital information appliance;
    a memory coupled to the processor for storing the program of instructions executable by said processor; and
    a network connection device coupled to the processor for coupling the digital information appliance to a network wherein the program of instructions configures the digital information appliance to access a resource;
    pass a registration interface dynamic base object to the resource; and
    interrogate the registration interface dynamic base object for registration information;
    wherein the registration interface dynamic base object transfers the interrogation for registration information to a registration implementation dynamic base object, the registration implementation dynamic base object capable of providing registration information.

16. The digital information appliance as described in claim 15, wherein the resource is located on a first computer system, the registration interface dynamic base object is located on a second computer system, and the registration implementation dynamic base object is located on a third computer system.

17. The digital information appliance as described in claim 15, wherein the registration interface dynamic base object is capable of transferring the interrogation for registration information to the registration implementation dynamic base object without centralized control.

18. The digital information appliance as described in claim 15, wherein the registration interface dynamic base object is embedded in a request for accessing the resource.

19. The digital information appliance as described in claim 18, wherein the registration interface dynamic base object is embedded so that as a connection is initiated between a digital information appliance and the resource, registration information is capable of being provided without additional user input.

20. The digital information appliance as described in claim 15, wherein the registration implementation dynamic base object is included in a universal register.

21. The digital information appliance as described in claim 15, wherein the resource is not preregistered, the registration implementation dynamic base object is capable of providing registration information to the resource.

22. The digital information appliance as described in claim 15, wherein at least one of the interface dynamic base object and implementation dynamic base object includes data formatted in a string naming convention.

23. The digital information appliance as described in claim 22, wherein the convention includes data formatted as <generalname>.<objectname>.<method/property>.

* * * * *